Feb. 18, 1969  E. S. WELCH  3,428,072
LIQUID PROCESSING SYSTEM
Filed March 18, 1966  Sheet 1 of 2
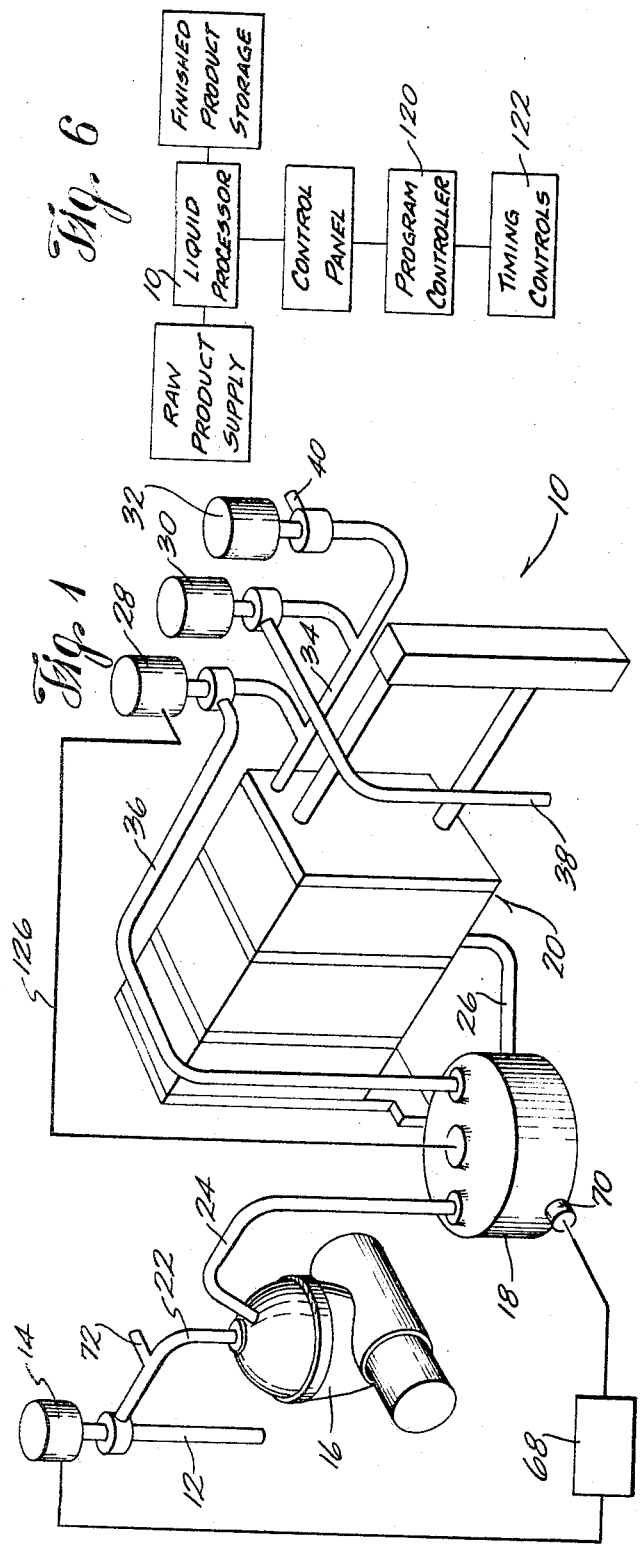
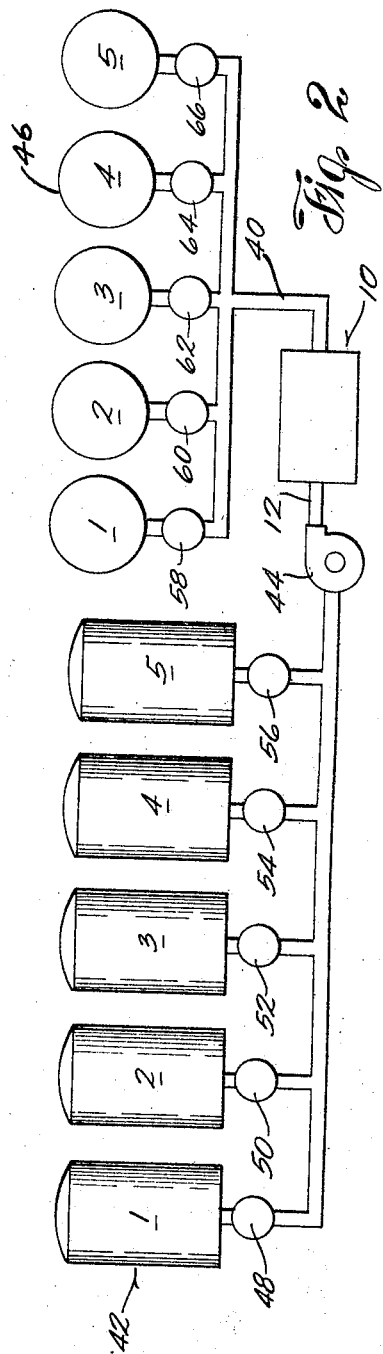
Inventor
E. Scott Welch
By Paul R. Puerner
Attorney

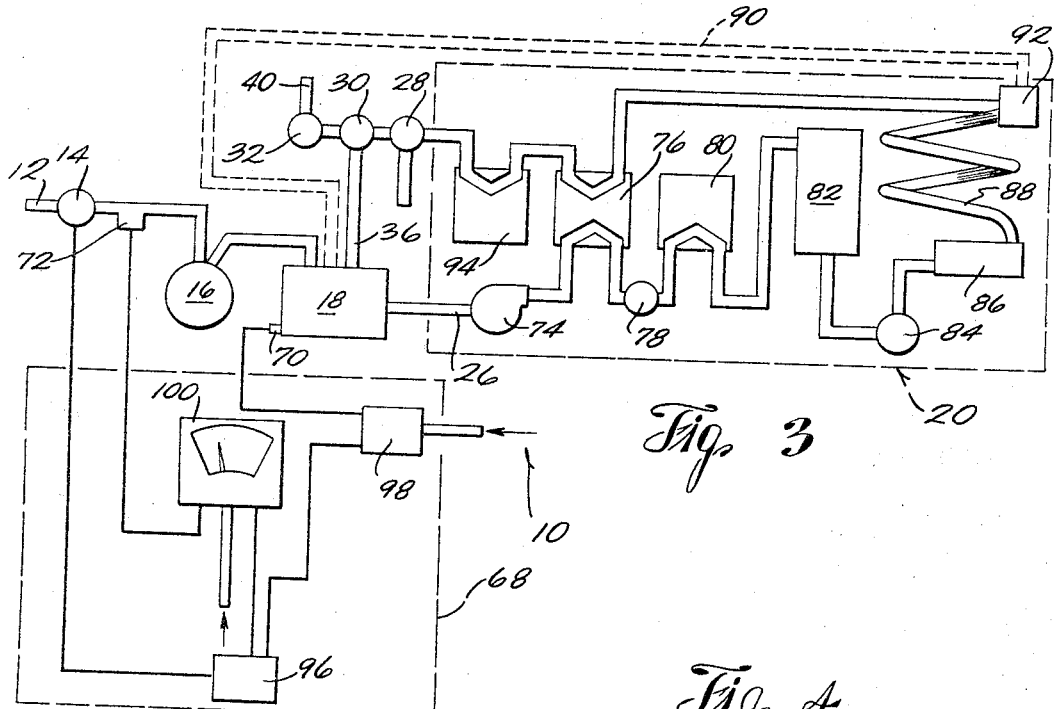
Fig. 3
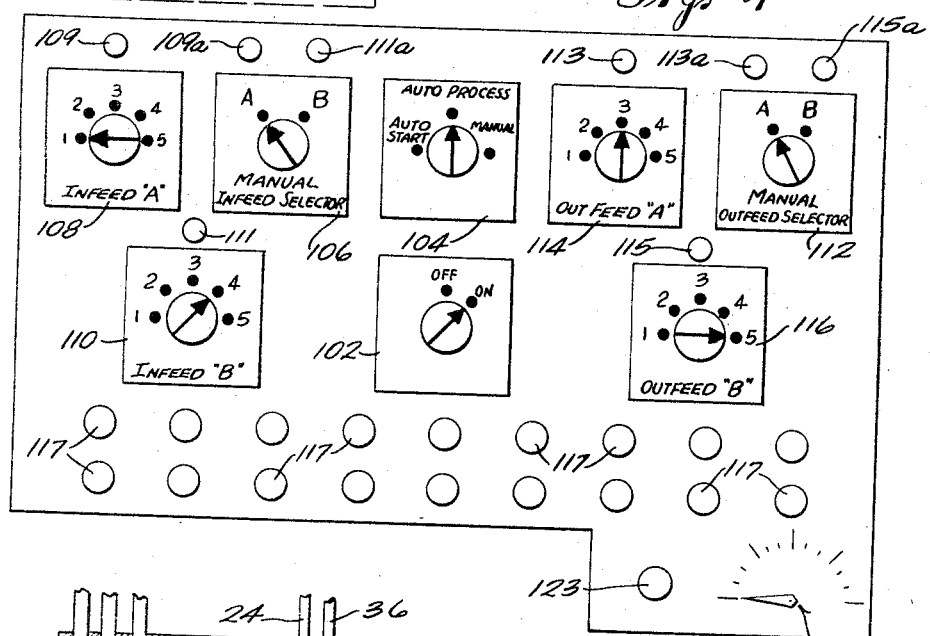
Fig. 4
Fig. 5
Inventor
E. Scott Welch
By Paul R. Puerner
Attorney

United States Patent Office 3,428,072
Patented Feb. 18, 1969

3,428,072
LIQUID PROCESSING SYSTEM
Elmer Scott Welch, Mequon, Wis., assignor to G & H Products Corporation, Kenosha, Wis., a corporation of Wisconsin
Filed Mar. 18, 1966, Ser. No. 535,603
U.S. Cl. 137—113      9 Claims
Int. Cl. G05d 7/06; F16k 21/18; E03b 1/00

ABSTRACT OF THE DISCLOSURE

A liquid processing system including a liquid processor having a raw product supply line, a finished product line and a balanced tank in the supply line. A plurality of raw product supply tanks are connected to the supply line and a plurality of finished product tanks are connected to the finished product line. A pump means is provided for pumping the liquid through the system and a control means is provided for transferring the system between pre-selected pairs of supply and finished product tanks. The control means includes a supply valve arrangement operative to selectively connect each supply tank independently to the supply line, and also includes a finished product valve arrangement operative to selectively connect each finished product tank independently to the finished product line. The control further includes a first and second level sensor means in the balance tank and an infeed control valve in the supply line upstream of the balance tank. A master controller and a timer control are provided to control the proper sequence and time of operation.

---

This invention relates to a liquid processing system and more specifically to improved means for automatically controlling the various operations of a milk pasteurization system.

A milk pasteurizing system of the type involved herein is comprised of a liquid processor supplied from a plurality of supply tanks and adapted to discharge a finished product therefrom to a plurality of finished products tanks. It is not uncommon in current dairy operations to process as many as five or more different types of milk products in a single day's operation. In such an operation it is important that the pasteurization system be operative to transfer quickly and efficiently from a supply tank having one product therein to a second supply tank having a somewhat different product. It is also important in transferring from one supply tank to another that a minimum of blending of the different types of products occur in the system. It is the principal object of this invention, therefore, to provide a liquid processing system wherein the transfer between pairs of supply and finished product tanks can be accomplished quickly and efficiently with a minimum amount of blending of the various products being handled.

A further object of this invention is to provide an improved infeed control system for the liquid processor wherein the system will react quickly to a loss of produce in the system and quickly restore the normal flow through the system when such a scarcity occurs.

The objects of this invention are attained by liquid processing system comprising a liquid processor which includes a raw product supply line, a finished product line and a balance tank in the supply line. Also provided is a raw product supply comprising a plurality of supply tanks each connected to the supply line and a finished product storage means comprising a plurality of finished product tanks, each of which are connected to the finished product line. A pump means is provided for pumping the liquid through the system. Also provided is a control means for transferring the system between preselected pairs of supply and finished product tanks. Such control means includes a supply valve arrangement operative to selectively connect each supply tank independently to said supply line. Similarly, a finished product valve arrangement is provided which is operative to selectively connect each finished product tank independently to the finished product line. The control means further includes a first and second level sensor means in the balance tank and an infeed control valve in the supply line upstream of the balance tank. Finally, a master controller and a timer control is provided to control the proper sequence and time of operation.

In the transfer operation of the system, the first level sensor means is operative to cause the supply valve arrangement to transfer connection to the supply line from one supply tank to another when the lever in the balance tank begins to drop. Such drop in balance tank level occurs when the supply tank in use is emptied. The timer means then operates to shut the infeed valve at a predetermined time interval after the supply tank transfer occurs. Such time interval is based on the time it takes for product to flow from thte exhausted tank to the infeed control valve. When the infeed control valve is closed the level in the balance tank will continue to drop causing the second level sensor means to reopen the infeed valve. The timer control is then further operated to cause the finished product valve arrangements to transfer connection of the finished product line from one finished product tank to another at a predetermined time interval after the infeed valve is opened. Such last-mentioned predetermined time interval is based on the time it takes for product to flow from the balance tank to the finished product storage tanks once the infeed valve is reopened.

Other objects and advantages will be pointed out in, or be apparent from, the description and claims, as will obvious modifications of the single embodiment shown in the drawings, in which:

FIG. 1 is a simplified schematic layout of a portion of a liquid processing system embodying this invention;

FIG. 2 is a simplified schematic layout showing the raw product supply tanks and the finished product tanks for the system shown in FIG. 1;

FIG. 3 is a more detailed schematic layout of the system shown in FIG. 1;

FIG. 4 is a typical control panel layout adapted for use with the system shown in FIG. 1;

FIG. 5 is a side elevation view (with parts broken away) of the balance tank used in the system; and FIG. 6 is a schematic layout showing the various control instrumentalities used in controlling the system of this invention.

While the improvements of the present invention could be employed to advantage in liquid processing systems of various types, for purposes of explanation the present invention is shown in the drawings and described hereinafter as embodied in what is known as a "short time" milk pasteurizer.

Referring now to the drawings in detail, FIG. 1 is a simplified schematic layout of the processing portion of the system indicated generally by numeral 10. As shown, such liquid processor 10 is comprised of a raw product supply line 12, an infeed control valve 14, a clarifier 16, a balance tank 18, and a short time pasteurization system 20 (shown in dotted lines in FIG. 3) connected in series flow relationship by lines 22, 24 and 26. A series of three control valves 28, 30 and 32 are connected to outlet line 34. While the function of valves 28, 30 and 32 will be described in greater detail hereinafter, briefly stated valve 28 operates to divert flow back to balance tank 18 through a line 36, valve 30 operates to divert flow to a drain (not shown) through a line 38 and valve 32 operates to control flow from the pasteurizer outlet 34 to a finished product line 40 which leads to the finished product tanks. While valves 14, 28, 30, 32 may be of any suitable design, in the preferred embodiment they are air operated for control from a remote point by an air signal.

As shown in FIG. 5, balance tank 18 is provided with a feed sensor means which includes three sets of level probes 118, 124 and 126, the operation of which will be described in detail hereinafter. It should also be noted at this point that while valves 14, 28, 30 and 32 in the preferred embodiment are of the air operated type such valves could be of other types wherein the operation thereof is controlled from a remote control point.

As shown in FIG. 2, the raw milk to be processed is supplied from a plurality of raw product supply tanks 42 numbered 1–5. Milk from such supply tanks is pumped to liquid processor 10 by a pump 44 and flows from the processor to a plurality of finished product tanks 46 numbered 1–5. Flow from the supply tanks is controlled by a supply valve means comprising valves 48, 50, 52, 54 and 56 and flow into the finished product tanks 46 is controlled by a finished product valve means comprising valves 58, 60, 62, 64 and 66.

Referring now to FIG. 3, a raw product infeed control means 68 is shown outlined in dotted lines. Such means includes two pressure pick-up points, one located in balance tank 18 designated by numeral 70 and the other located immediately downstream of valve 14 in line 22 designated by numeral 72. While the particular components of short term pasteurizer 20 are not a part of this invention as such, such components are shown schematically in FIG. 3 and include a booster pump 74, a regenerator section 76, a timing pump 78, a heater section 80, a vacuum chamber 82, a vacuum discharge pump 84, a homogenizer 86, a holding tube 88, a divert line 90, a flow diversion valve 92, and a cooler section 94.

Under any operating condition which creates a low level condition in the balance tank, it is desirable to obtain the highest feed rate practical to build up a normal operating level in the system. In the system shown, the pasteurization system 20 has a capacity of 60,000 lbs./hour and the clarifier 16 has a capacity of 66,000 lbs./hour.

Turning now to the operation of infeed control means 68 broadly stated such means operates to place the control of the clarifier feed rate under the control of the signal from pressure pick-up point 72 during low level conditions in balance tank 18 and to transfer control to the signal from pressure pick-up 70 when normal operating level in tank 18 is reached. This is accomplished by feeding the respective signals from points 70 and 72 to a selecting relay 96 which functions to select the larger of the two signals and apply it to infeed control valve 14. The two signals are adjusted to a compatible basis for accurate comparison at relay 96 by means of an amplifier 98 and a controller unit 100, as shown.

During periods of normal operation (normal level in tank 18) the signal from point 70 will be higher and thus will be selected by relay 96 to control valve 14. As previously indicated, this signal is designed to hold a steady level in the balance tank which will result in maintaining the 60,000 lbs./hour flow rate of the system. If for any reason such as start-up or product transfer from one supply tank to another the level in balance tank 18 drops appreciably the signal from point 72 will be greater and the system will operate to transfer control of the valve 14 to the signal from point 72. This signal, as previously indicated, is designed to permit a maximum feed rate of 66,000 lbs./hour at valve 14. This increased maximum feed rate serves to restore a normal operating level in the balance tank. When the normal level is restored, control is again transferred to point 70 in tank 18 which functions to maintain a steady level so long as control point 70 does not call for a flow in excess of 66,000 lbs./hour. Should flow demand due to low level reach the high limit of 66,000 lbs./hour, control is transferred to point 72 until high demand is satisfied.

Transfer control system

As previously indicated, one of the primary objects of this invention is to provide a control system for transferring liquid processor 10 between pairs of feed tanks 42 and finished product tanks 46 in a manner wherein the product from one feed tank will not be mixed with the product from another feed tank. In a typical milk pasteurizing installation milk of several different types (percent butter fat, etc.) will be processed in the course of a single day's operation. Assume for example that each of the raw milk supply tanks 42 (Nos. 1–5) contains a different type of milk. The control system for transferring flow from one pair of supply and storage tanks to another pair will now be described.

Referring now to FIG. 4, control of the system is accomplished from a control panel comprising a plurality of selector switches. Switch 102 is for ON–OFF control. Switch 104 is to select the desired mode of operation, automatic start, automatic process and manual. On the infeed side is manual infeed selector switch 106 used for control in the manual mode of operation and a pair of corresponding infeed tank selector switches 108 and 110 used for both automatic and manual mode of operation. Similarly, on the outfeed side is a manual outfeed selector switch 112 and a pair of corresponding outfeed selector switches 114 and 116. A plurality of manual pushbutton switches 117 are provided to facilitate manual control of the various system components when the mode selector switch 104 is set for manual operation.

The panel control switches, as shown in FIG. 4, are set with mode selector switch 104 on automatic process and the system in operation. The automatic programming system will be determine which infeed is operating. In a steady operating condition (not transferring to new product) both infeed and outfeed will be on the same selection A or B. The process operator will know which infeed or outfeed systems A or B are in operation by the lights 109, 111, 113, 115 over infeed switches 108 and 110 and outfeed switches 114 and 116. Also the corresponding lights 109a, 111a, 113a, 115a over manual switches 106 and 112 will light according to the infeed and outfeed in use.

In the "automatic mode" of operation the infeed and outfeed is determined by the position of programmer 120 (see FIG. 6). Automatic operation always changes from A to B (or vice versa) whenever a transfer is completed. For example, if present operation is on A infeed switch 108 and A outfeed switch 114 the next transfer will change the infeed to selection B switch 110 and subsequently when transfer is complete the outfeed to selection B switch 116. With automatic operation mode controlling the system in a steady state A selection operation, the raw product feed tank used to supply the system 10 will be the No. 1 tank as indicated by the setting of infeed A switch 108, as shown. Similarly, the finished product storage tank used to receive flow from the system 10 will be the No. 3 tank as indicated by the setting of outfeed A switch 114, as shown. It should be noted at this point that unless "manual mode" of operation is selected switches 106 and 112 have no control function. Thus, with the settings as above described raw milk is being pumped from supply tank No. 1 by pump 44 through system 10 and into finished product tank No. 3. With the system operating as described above, tank valves 48 and 62 will be open and all other tank valves 50, 52, 54, 58, 60, 64 and 66 will be closed.

Now with the system operating as described above, assume that it is desired to run product from tank No. 1 until empty and then switch to supply tank No. 4 and run product therefrom into finished product tank No. 5. This can be accomplished by simply setting infeed B switch 110 to No. 4 position and outfeed B switch 116 to No. 5 position.

With these settings and system operating in "automatic mode," raw product will continue to be pumped from tank No. 1 until it is empty. When tank No. 1 becomes empty the liquid level in balance tank 18 will drop. As shown in FIG. 5, as the level in tank 18 drops the first thing that happens is that the liquid will drop off the ends of level probes 118. When this occurs a master controller unit 120 (FIG. 6) is actuated which in turn will shut valve 48 at tank No. 1 and at the same time open valve 54 at supply tank No. 4. This will of course, start the first portion of milk from tank No. 4 to chase the last portion of milk from tank No. 1 through the system.

Simultaneously, with the closing of valve 48 and the opening of valve 54 the controller 120 will start a timer control unit 122 which will run for a predetermined period of time at the end of which period the controller will close infeed control valve 14. This first time period is set to allow the last portion of product from supply tank No. 1 to flow to balance tank 18.

With valve 14 closed the level in balance tank 18 will drop. When the level drops off probes 124, master controller will open valve 14 and at the same time start timer control unit 122 running again. The timer control unit will run for a predetermined period of time, at the end of which period the controller will shut valve 62 at finished product tank No. 3 and open valve 66 at finished product tank No. 5. This second time interval is set to allow all product in the balance tank at the time valve 14 is opened to flow into finished product tank No. 3. Product from supply tank No. 4 will, of course, be following the last portion from tank No. 1 and will be switched into finished product tank No. 5 at the end of such second time interval. A minimum of blending of the products results in the transfer operation as described above.

While the initiation of the transfer operation is normally accomplished by level probes 118 the transfer operation can also be initiated manually by a pushbutton switch 123 or by a timer switch 125 as shown in FIG. 4. Thus, if desired, the operator can initiate the transfer operation by actuating switch 123 or he can set timer switch 125 to start transfer a preselected time in the future.

Upon completion of the transfer operation described above, product will be flowing from supply tank No. 4 to finished product tank No. 5. At this time the operator can set up the system for the next automatic transfer operation. Also, the operator should set "manual" infeed switch 106 and "manual" outfeed switch 112 to selections B as now indicated by the signal lights 111a and 115a so that transfer from "automatic mode" to "manual mode" on switch 104 could be made without changing currently operating infeed and outfeed. Maintenance of compatible selections between "manual" and "automatic" infeed and outfeed selections makes practical switching mode of operation at switch 104 at any time desirable or necessary. Assume for the next operation flow is desired from supply tank No. 2 to finished product tank No. 1. This is accomplished by simply turning the infeed A switch 108 to the No. 2 position and the outfeed A switch 114 to the No. 1 position. With these settings, when supply tank No. 4 is emptied the system will be automatically transferred to the combination of supply tank No. 2 and finished product No. 1 in the manner previously described.

If for any reason, either during the transfer operation described or during normal operation, the supply of raw product to pasteurization system 10 is cut off or substantialy reduced the level in balance tank will, of course, drop. When the level drops off the ends of probes 126, valve 28 will be opened to divert flow back into the balance tank through line 36. This will cause a recirculating flow to occur in the system and thus prevent overheating of the product and the resultant burning-on of the product in the pasteurizer.

Although but one embodiment of the present invention has been illustrated and described, it will be apparent to those skilled in the art that various changes and modifications may be made therein wtihout departing from the spirit of the invention or from the scope of the appended claims.

I claim:
1. A liquid processing system comprising:
 a liquid processor including a raw product supply line and a finished product line;
 a raw product supply means including a plurality of supply tanks, each connected to said supply line;
 a finished product storage means including a plurality of finished product tanks, each connected to said finished product line;
 pump means for pumping liquid through the system; and
 a control means for transferring the system between preselected pairs of supply and finished product tanks, said control means including a supply valve means operative to selectively connect one supply tank to said supply line, a finished product valve means operative to selectively connect one finished product tank to said finished product line, a feed sensor means in said liquid processor, an infeed control valve in said supply line, a timer means, a transfer initiation means, said transfer initiation means operative when actuated to cause said supply valve means to transfer connection of said supply line from one supply tank to another, said timer means operative to shut said infeed valve at a predetermined time interval after said supply tank transfer occurs, said feed sensor means operative to reopen said infeed valve when product from said one tank clears said feed sensor means after closure of said infeed valve, said timer means further operative to cause said finished product valve means to transfer connection of said finished product line from one finished product tank to another at a predetermined time interval after said infeed valve is opened.

2. A liquid processing system according to claim 1 in which said transfer initiation means is comprised of a balance tank in said supply line and a level sensor means in said balance tank.

3. A liquid processing system according to claim 1 in which said transfer initiation means is comprised of a switch adapted for manual actuation.

4. A liquid processing system according to claim 1 in which said transfer initiation means is comprised of a timer switch which when actuated will start the transfer sequence a predetermined time interval thereafter.

5. A liquid processing system comprising:
 a liquid processor including a raw product line, a finished produt line and a balance tank in said supply line;
 a raw product supply means including a plurality of supply tanks, each connected to said supply line;
 a finished product storage means including a plurality of finished product tanks, each connected to said finished product line;
 pump means for pumping liquid through the system; and
 a control means for transferring the system between preselected pairs of supply and finished product tanks, said control means including a supply valve means operative to selectively connect one supply tank to said supply line, a finished product valve means operative to selectively connect one finished product tank to said finished product line, a level sensitive means in said balance tank, a timer means, and a transfer initiating means, said transfer initiating means operative to cause said supply valve means to transfer connection to said supply line from one supply tank to another, said timer means operative to shut said infeed valve at a predetermined time interval after said supply tank transfer occurs, said level sensitive means in said balance tank operative to reopen said infeed valve when the level in said tank drops to a predetermined level due to the closure of said infeed valve, said timer means further operative to cause said finished product valve means to transfer connection of said finished product line from one finished product tank to another at a predetermined time interval after said infeed valve is opened.

6. A liquid processing system comprising:
a liquid processor including a raw product supply line, a finished product line, and a balance tank in said supply line;
a raw product supply means including a plurality of supply tanks, each connected to said supply line;
a finished product storage means including a plurality of finished product tanks, each connected to said finished product line;
pump means for pumping liquid through the system; and
a control means for transferring the system between preselected pairs of supply and finished product tanks, said control means including a supply valve means operative to selectively connect one supply tank to said supply line, a finished product valve means operative to selectively connect one finished product tank to said finished product line, and level sensitive means in said balance tank operative to cause said supply valve means to transfer connection to said supply line from one supply tank to another when the level in said balance tank begins to drop, said level sensitive means further adapted to cause said finished product valve means to transfer connection of said finished product line from one finished product tank to another when the last portion of product from said one supply tank reaches said finished product storage means.

7. A liquid processing system comprising:
a liquid processor including a raw product line, a finished product line, and a balance tank in said supply line;
a raw product supply means including a plurality of supply tanks, each connected to said supply line;
a finished product storage means including a plurality of finished product tanks, each connected to said finished product line;
pump means for pumping liquid through the system; and
a control means for transferring the system between preselected pairs of supply and finished product tanks, said control means including a supply valve means operative to selectively connect one supply tank to said supply line, a finished product valve means operative to selectively connect one finished product tank to said finished product line, a first level sensor means in said balance tank, a second level sensor means in said balance tank, an infeed control valve in said supply line upstream of said balance tank, and a timer means, said first level sensor means operative to cause said supply valve means to transfer connection to said supply line from one supply tank to another when the level in said balance tank begins to drop, said timer means operative to shut said infeed valve at a predetermined time interval after said supply tank transfer occurs, said second level sensor means operative to reopen said infeed valve when the level in said valve tank drops to a predetermined level due to the closure of said infeed valve, said timer means further operative to cause said finished product valve means to transfer connection of said finished product line from one finished product tank to another at a predetermined time interval after said infeed valve is opened.

8. A liquid processing system according to claim 7 in which said first and second level sensors in said balance tank are probe units positioned at different levels in said tank, 9. A liquid processing system according to claim 7 in which said second stated predetermined time interval is determined by the length of time it takes for liquid product to flow from said balance tank to said finished product storage means after said infeed control valve is reopened.

References Cited

UNITED STATES PATENTS 3,056,417    10/1962    Greaves ---------- 137—486 X
3,181,556    5/1965    Baker -------------- 137—389

ALAN COHAN, *Primary Examiner.*

D. R. MATTHEWS, *Assistant Examiner.*

U.S. Cl. X.R.

137—119, 263, 266, 389, 392, 624.11